United States Patent
Morgoun

(10) Patent No.: US 7,276,165 B2
(45) Date of Patent: Oct. 2, 2007

(54) METHOD AND PLANT FOR BIOLOGICAL TREATMENT OF AQUEOUS EFFLUENTS FOR PURIFICATION THEREOF

(75) Inventor: Serge Morgoun, Arnouville les Mantes (FR)

(73) Assignee: Degremont, Rueil-Malmaison (FR)

( * ) Notice: Subject to any disclaimer, the term of this patent is extended or adjusted under 35 U.S.C. 154(b) by 170 days.

(21) Appl. No.: 10/500,844

(22) PCT Filed: Jan. 28, 2003

(86) PCT No.: PCT/FR03/00267

§ 371 (c)(1),
(2), (4) Date: Jan. 25, 2005

(87) PCT Pub. No.: WO03/064334

PCT Pub. Date: Aug. 7, 2003

(65) Prior Publication Data

US 2006/0138047 A1    Jun. 29, 2006

(30) Foreign Application Priority Data

Jan. 29, 2002  (FR) ................... 02 01045

(51) Int. Cl.
C02F 3/12  (2006.01)

(52) U.S. Cl. ............... 210/614; 210/623; 210/197; 210/259; 210/908

(58) Field of Classification Search ............... 210/620, 210/621, 623, 626, 629, 194, 197, 614, 252, 210/259, 908
See application file for complete search history.

(56) References Cited

U.S. PATENT DOCUMENTS

| | | | | |
|---|---|---|---|---|
| 4,269,714 A | * | 5/1981 | Ishikawa et al. | 210/627 |
| 4,442,005 A | | 4/1984 | Breider | |
| 4,663,044 A | * | 5/1987 | Goronszy | 210/610 |
| 4,859,341 A | * | 8/1989 | Schreiber | 210/614 |
| 4,891,136 A | * | 1/1990 | Voyt | 210/605 |
| 5,013,441 A | * | 5/1991 | Goronszy | 210/605 |
| 5,573,670 A | * | 11/1996 | Nagasaki et al. | 210/614 |
| 5,624,562 A | * | 4/1997 | Scroggins | 210/605 |
| 5,942,108 A | * | 8/1999 | Yang | 210/195.3 |
| 6,254,778 B1 | | 7/2001 | Chudoba et al. | |

FOREIGN PATENT DOCUMENTS

DE   26 31 825 A   1/1978
DE   100 09 251 A  9/2001

* cited by examiner

*Primary Examiner*—Fred G. Prince
(74) *Attorney, Agent, or Firm*—Connolly Bove Lodge & Hutz LLP

(57) ABSTRACT

The invention relates to a method for the biological treatment of effluents contaminated with impurities of urban or industrial origin, characterised in employing a single aeration tank (1) with a high mass charge in which the raw effluent or mechanically pre-treated effluent is mixed without previous decantation with a free microbial culture of the activated sludge type, growing in a lightly aerated medium, of the order of 0.1 to 0.2 kg $O_2$/kg BOD5 removed, the organic charge applied having a value equal to or greater than at least 2 kg COD/kgSM/day, preferably equal to or greater than 4 kg COD/kgSM/day, the hydraulic residence time for the raw effluent in the single aeration tank being between 30 and 90 minutes, preferably between 40 and 60 minutes.

10 Claims, 3 Drawing Sheets

METHOD AND PLANT FOR BIOLOGICAL TREATMENT OF AQUEOUS EFFLUENTS FOR PURIFICATION THEREOF

FIELD OF THE INVENTION

The present invention relates to the biological treatment of aqueous effluents, such as, in particular, domestic wastewater and industrial wastewater, for the purpose of their purification.

More particularly, the invention relates to an improved method and device for the biological treatment of such effluents, employing free cultures of microorganisms according to the activated sludge technique in order to remove the carbon pollution present in the effluents to be treated.

BACKGROUND OF THE INVENTION

Among the known purification processes that use free cultures of microorganisms, those using so-called "low loading" activated sludges have come into increasingly frequent use.

These methods of the "extensive" type have the feature of working with low applied mass and volumetric loadings, with high hydraulic residence times and a medium settling sludge, which leads to the construction of rather large structures, in terms of aeration tanks as well as clarification systems.

Moreover, the devices that put these conventional purification methods into practice generally require a chain of specialized units which carry out in succession the screening, sediment removal, degreasing and primary settling of the effluent to be treated, these units being positioned upstream of the step of actual biological treatment with activated sludge.

This explains why the installations of the prior art are costly, in terms of their construction as well as their operation and maintenance.

BRIEF DESCRIPTION OF THE INVENTION

To alleviate these drawbacks, the present invention provides a method for the biological treatment of effluents contaminated with impurities of municipal or industrial origin, characterized in that it employs a single aeration tank with high mass loading in which the raw or mechanically pretreated effluent is mixed, without prior settling, with a free microbial culture of the activated sludge type, growing in a lightly aerated medium, of the order of 0.1 to 0.2 kg $O_2$/kg BOD5 removed, the applied organic loading being equal to or greater than at least 2 Kg COD/Kg SM/day, preferably equal to or greater than 4 Kg COD/Kg SM/day, the hydraulic residence time of the raw effluent in the single aeration tank being between 30 and 90 minutes, and preferably between 40 and 60 minutes.

This explains why the overall system, which, in an installation of the prior art, consists of the primary settler and the aeration tank, is replaced, according to the invention, by a single aeration tank with a high mass loading.

It is known that the mass loading is defined by the ratio of the daily pollution flow expressed in COD or in BOD5 to the quantity of dry matter present in the aeration tank. For the putting into practice of the method of the invention, the value of this mass loading must be above 1.5 Kg COD/Kg SM/day, and with a solid matter concentration between 0.5 and 2.5 g SM/l, which gives rise to applied volumetric loadings above 3 kg BOD5 /$m^3$/day.

Thanks to these features according to the invention, the volume of the single aeration tank is reduced to the minimum by a factor of 10, in comparison with the activated sludge treatment tank of the conventional installations with prolonged aeration and low applied loading.

The method of the invention as described above is based on biosorption: in a very high loading aeration tank, a portion of the dissolved carbon pollution, and nearly the entire colloidal and particulate fraction, are biosorbed by the activated sludge floc.

In effect, the fact that, according to the invention, the purifying action is based primarily on biosorption mechanisms and not on oxidation or fermentation biological mechanisms, and that the method serves to avoid a primary settling and the use of sediment removal and degreasing, serves to maintain a high content of colloidal and particulate matter in the effluent to be treated, these compounds promoting the biosorption.

Biosorption can be described as a physicochemical mechanism in which the removal of the pollution corresponds to a rapid transfer of matter from the liquid phase to the floc, by adsorption, absorption and trapping.

Three mechanisms immediately occur when the effluent enters into contact with the sludge (see Eikelboom-1982 in Bulking of Activated Sludge: Preventive and Remedial Methods, Ellis Horward Publ., Chichester, 90–105 "Biosorption and prevention of bulking sludge by means of a high floc loading") and are superimposed in the overall mechanism called "biosorption", that is:

1—the retention of the colloidal products by physicochemical adsorption on the floc ("surface fixation"), which leads to a bulking thereof;

2—the retention of the suspended matter by imbrication in the biological floc;

3—the extra- and intracellular absorption of the soluble organic matter by the microorganisms.

At the very short hydraulic residence times imposed by the present invention (30 to 90 minutes), the microbial population does not have sufficient time to hydrolyze and to metabolize the adsorbed pollution.

By contrast, absorption reflects the bacterial behavior and its capacity to accumulate nutrient reserves: intracellular "storage" for subsequent oxidation can correspond to 50% of the mass of the microorganism (see Ekama G. A. et al., 1979, journal WPCF, 51, 3, 534–556 "Dynamic behavior of the activated sludge process").

In the method according to the present invention, this absorption is only made possible if the bacteria are maintained in a situation of "stress", which implies a minimal input of oxidation energy. In consequence, according to one feature of the method of the invention, the method is controlled at the anaerobiosis limit, by regulating the dissolved oxygen content at values between 0.1 and 1 mg/l.

This explains why the method according to the invention as described above is based on the trapping of the pollution by the "Activated Sludge" adsorbent and without biological degradation by oxidation or fermentation, the activated sludge used changing continuously at high applied mass loading, while maintaining a low aeration to guarantee the mixing energy for the system and sufficient energy for the biosorption.

The high applied loading levels promote the adsorption and absorption mechanisms, while keeping the biomass in a state of maintenance with a virtually zero growth rate. These conditions, which are characteristic of the method of the invention, confer outstanding properties on the very high loading sludge, and particularly the following:

the settlable pollution preserved in the absence of primary pretreatment serves to ballast the floc formed and thereby to achieve excellent clarification; the sludge index is remarkable with values in the range of 40 ml/g, values which are not obtained in the high loading method, according to the prior art, in which the aeration tank is preceded by a primary settler;

the very good quality of the very high loading sludge, which has a suspended matter concentration of the order of 0.5 to 2.5 g/l, preferably between 0.6 and 1.5 g/l (these values can be compared with the values of 3 to 4 g/l which are recommended in the prior art, particularly in FR-A-2 594 113) serves to apply high upward velocities (>2 m/h) in the clarifier which is associated with the single aeration tank, as described below;

aeration is a parameter that influences the performance of any biological system; paradoxically, according to the method of the invention, for a very high loading sludge, the oxygen demand is maintained limiting in order to guarantee a good biosorption, at the cost of a lower purification efficiency on the easily assimilable organic matter;

this limitation of the oxidation metabolism is even more easily obtained if the hydraulic residence time is kept at a low value.

The advantage of a system with a high or very high applied loading, according to the present invention, over the low loading systems, is considerable.

Such so-called "intensive" systems allow the design of much more compact structures with the same volume of incoming pollution to be treated, in terms of the aeration tank as well as the clarification system, the sludges having excellent settling properties.

The biosorption mechanism taking place in the method of the present invention is characterized by higher reaction kinetics (factor of 2 to 3) than the biological reactions observed in conventional activated sludges, and with a low air input (0.1 to 0.2 Kg $O_2$/kg $BOD5$ removed compared with 0.6 Kg $O_2$/kg $BOD5$ removed respectively).

As to the reaction times, the orders of magnitude are as follows:

15 minutes for biosorption according to the method of the invention;

about 30 to 45 minutes for metabolization according to conventional methods.

The method according to the present invention is clearly distinguished from the prior art of the so-called very high loading methods, by specific conditions of use of the free culture, allowing for continuous growth in a lightly aerated medium and at high applied mass loading, to promote the mechanisms of biosorption and BOD storage.

Thus, the very high loading activated sludge method developed by Professor Boehnke (see Boehnke B. et al., 1997, Water Environment & Technology, 23–27 "AB Process removes organics and nutrients" and Boehnke B. et al., 1998, Water Engineering & Management, 31–34 "Cost-effective reduction of high-strength wastewater by adsorption-based activated sludge technology") does not refer to biosorption mechanisms, but to a microbiological selection pressure, leading to a specificity by adaptation of the biocenosis, reflected by the appearance of a bacterial population specific to the Very High Loading methods, in other words, metabolically more active methods. In this prior art, no reference is made to biosorption as an essential purifying mechanism, this mechanism only being used as a buffer during loading surges.

Furthermore, the purification efficiencies are low (in the neighborhood of 50% for $BOD5$), whereas the method of the present invention serves to obtain average reductions in the range of 75% for $BOD5$ and 80% for SM.

In terms of intensive methods, the prior art does not enable a person skilled in the art to control the implementation and the running of an activated sludge method, like the high loading or very high loading method, covered by the invention. In fact, it is well known to a person skilled in the art that these systems are very sensitive to loading surges, hydraulic or biological overloads, resulting in a rapid degradation of the efficiency and of the quality required of the treated water (in terms of carbon pollution and suspended matter).

Thus, conventionally, during rainfall events, in which a degradation is observed in the composition of the water to be treated, these intensive methods prove to be inappropriate with a risk of leaching, potentially very rapid, of the solid matter present in the reactor, making the treatment of the effluent to the requisite quality impossible, the restoration of a normal situation occurring after up to more than 48 hours.

The method covered by the invention, like any so-called intensive biological system, demonstrates very high responsiveness to the variations in the parameters of the untreated water.

Considering the high ratio of pollution to the biomass present and consequently the low biomass concentration (1 to 2 g/l of SM), a wide variation in the properties of the untreated water very quickly upsets the equilibrium of the system.

Unlike the prolonged aeration activated sludge method, that is, a so-called extensive system, the very high loading method only has a low buffer capacity.

A significant decrease in the effluent concentrations immediately causes leaching of the biomass present in the system. Similarly, a significant increase in the untreated water pollutant loading contents rapidly causes an increase in the suspended matter concentration in the single aeration tank, and a possible overloading of the clarifier associated with it, as shown below.

In order to make the method of the present invention more flexible, enabling it to withstand variations in volumetric or mass loading, a regulation system is provided, by adjustment of recirculation rate of the mixed liquor in the single aeration tank, this regulation being carried out so as to maintain the solid matter (suspended matter+biomass) within a preset range, preferably between about 1.0 and 1.5 g/l, and it is carried out by the continuous measurement of the turbidity of the activated sludge or of the mixed liquor, this measurement being combined with a slaving of the recirculation or extraction rate of said mixed liquor.

According to the invention, a regulation of the air input in the single tank can also be provided, in order to maintain a low dissolved oxygen setpoint, for example between 0.1 and 1 mg/l. In fact, the excess dissolved oxygen can be used to oxidize the very easily assimilable organic matter, which must be avoided in the case of the process according to the invention, in which an attempt is made to promote the biosorption mechanism.

Another subject of the invention is an installation for putting into practice the method described above. This installation is characterized in that it comprises:

a free culture reactor in which the free culture grows in an aerated medium, this reactor, which constitutes said single aeration tank, comprising continuous or intermittent air input means with associated mixing, means for continuous measurement of the turbidity of the activated sludge or of the mixed liquor and means for measuring the dissolved oxygen concentration, of which the data are processed by a servo system for slaving, on the one hand, the mixed liquor recirculation or extraction rate to maintain a constant solid matter content in said reactor and, on the other hand, the air input to maintain a low residual dissolved oxygen content in said reactor, an intermediate clarifier which separates the sludge from the depolluted effluent, and a sludge recirculation circuit from the intermediate clarifier to the free culture reactor, the recirculation (or extraction) rate being slaved to the turbidity measurement in the reactor.

Other features and advantages of the present invention will appear from the description provided below, with reference to the drawings appended hereto, which illustrate a nonlimiting embodiment. In the drawings:

DETAILED DESCRIPTION OF THE INVENTION

Figure 1:
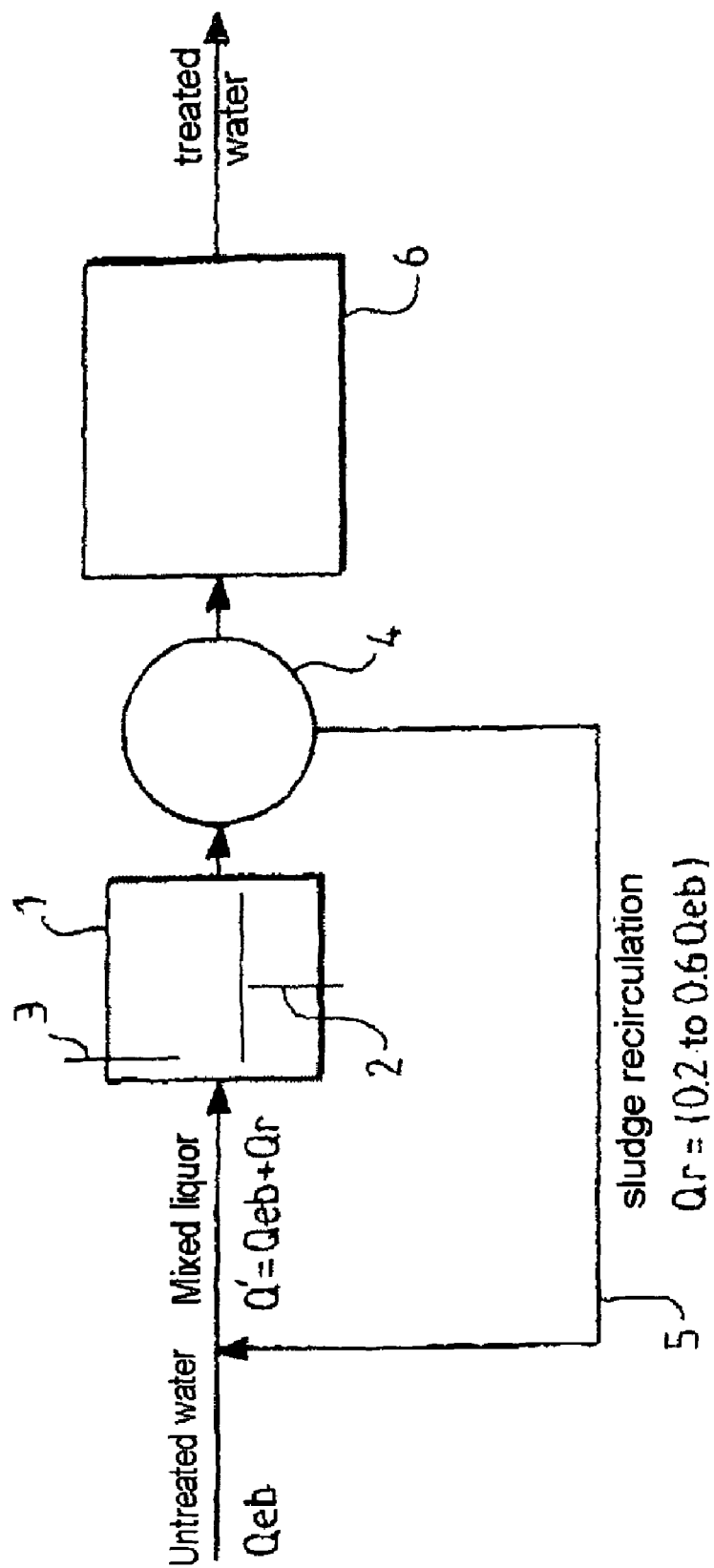
FIG. 1 shows an installation according to the present invention.

Reference to FIG. 1 shows that, in this embodiment, the device according to the invention comprises a reactor, or single aeration tank, with activated sludge under high loading, designated by the reference numeral 1, this reactor comprising continuous or intermittent air input means 2, the mixing energy being supplied mechanically, with a system for slaving to the dissolved oxygen content, and a turbidity measurement probe 3. In this embodiment, an intermediate settler 4 is associated with the reactor 1 in order to separate the sludge from the depolluted effluent. The installation further comprises a sludge recirculation circuit 5 from the intermediate settler 4 to the free culture reactor 1, the sludge recirculation rate (or sludge extraction rate from the intermediate settler 4) being slaved to the turbidity measurement supplied by the probe 3.

Together with this basic equipment of the device according to the invention, various means of a known type can be provided, serving to supplement the effluent treatment. Thus, the device can comprise a second stage 6 which can be:

a biomass nitrification reactor attached to a fixed or mobile support (depending on the suspended matter release limitations), receiving the intermediate effluent from the settler-clarifier 4;

a biomass denitrification reactor attached to a fixed or mobile support (depending on the suspended matter release limitations), receiving the intermediate effluent from the nitrification reactor. The assimilable carbon necessary can be supplied externally (in the form of methanol for example), or from anaerobic digestion of the sludge extracted from the reactor, said sludge being highly fermentable;

an anaerobic digestion reactor or any other sludge hydrolysis system for liquefying the fermentable fraction of this sludge and supplying the easily assimilable carbon necessary for the denitrification process or for a methanation process; the remaining sludge made inert after hydrolysis being separated by any suitable method such as centrifugation, microfiltration;

a methanation reactor for producing biogas and thereby supplying a portion of the energy necessary for the operation of the method.

Preferably, the reactor 1 operating with very high loading activated sludges takes the form of an aeration tank, known, in terms of chemical engineering, by the name of "integral mixing bioreactor" which achieves effective mixing with low energy consumption; since the properties of the water are the same at all points of the tank, the biosorption mechanism is promoted.

This type of tank has the drawback of being sensitive to the variations in flow rate and properties of the liquid to be treated, factors which are very frequently observed in the field of wastewater treatment. Since, according to the invention, the oxygen content is slaved, said sensitivity to the flow rate and pollution flow will have no repercussions on the treatment of the effluent.

As mentioned above, in order to enable the reactor 1 to withstand variations in volumetric or mass loading, the invention provides a control system, by adjustment of the recirculation rate of the mixed liquor (circuit 5), to maintain the solid matter (SM+biomass) within the preset range, preferably in the neighborhood of 1.0–1.5 g/l, as specified above. For this purpose, the turbidity is continuously measured, using the probe turbidimeter 3, or any other suitable sensor known to a person skilled in the art, for example: particle counter, spectrophotometer, etc., this measurement being combined with a device for slaving the recirculation or extraction rate of the mixed liquor. With the help of correlations taken from correction charts, this measurement serves to roughly characterize the content of suspended solid matter in the medium, thereby describing the operating conditions of the installation.

The practical advantage of using this parameter for regulating activated sludge purification methods has already been emphasized. Thus, FR-A-2 784 093 describes a method of automated recirculation management developed in order to control the sludge residence time in secondary clarification in the activated sludge methods, and this method uses a signal representing the sludge concentration obtained using a sensor positioned in the recirculation line. Moreover, FR-A-2 795 713 uses the turbidity measurement to characterize the pollutant load present in the untreated water, this measurement being associated with the colloidal and particulate pollution.

In the present invention, the signal obtained must represent the solid matter concentration, the biosorption mechanism not occurring exclusively with the microorganisms but also with the suspended matter present in the sludge. In these conditions, in the device according to the invention, the sensor such as 3 must be positioned either directly in the biological reactor 1 as shown in FIG. 1, or at the outlet of said reactor, on the water line supplying the associated clarifier 4. The sensor is positioned according to the rules of the art known to a person skilled in the art, in accordance with the type of sensor chosen.

The regulation put into practice according to the invention can consist in defining four suspended matter SM concentration intervals, in the single aeration tank 1. Each interval corresponds to an adapted operation, either of the mixed liquor recirculation pump from the clarifier 4 to the aeration tank 1, or of the sludge extraction pump.

Monitoring the suspended matter SM concentration from the slaving of the extraction flow rate serves to obtain a total flow rate that varies only slightly (wastewater+recirculation) through the system.

Thanks to this regulation, it is possible to reduce the variations in suspended matter concentration, in normal periods, and then to return rapidly to normal operation in case of disturbances due, for example, to loading surges, rainfall events etc.

Preferably, the setpoints defined are as follows: target concentration 1.5 g/l, concentration deviation ±0.3 g/l, floor concentration 1 g/l.

During a rainfall event, the dilution of the pollutants present in the untreated water causes a drop in the applied solid matter in the reactor 1. This variation immediately causes an increase in the recirculation rate or a decrease in the extraction rate, to avoid any risk of leaching (removal of solid matter present in the reactor).

During daily peaks, the pollutant concentrations increase, as well as the applied loadings; this variation immediately causes a reduction of the recirculation rate or an increase of the extraction rate, to avoid a saturation of the clarifier, which would result in sludge losses in the treated water.

Figure 3:
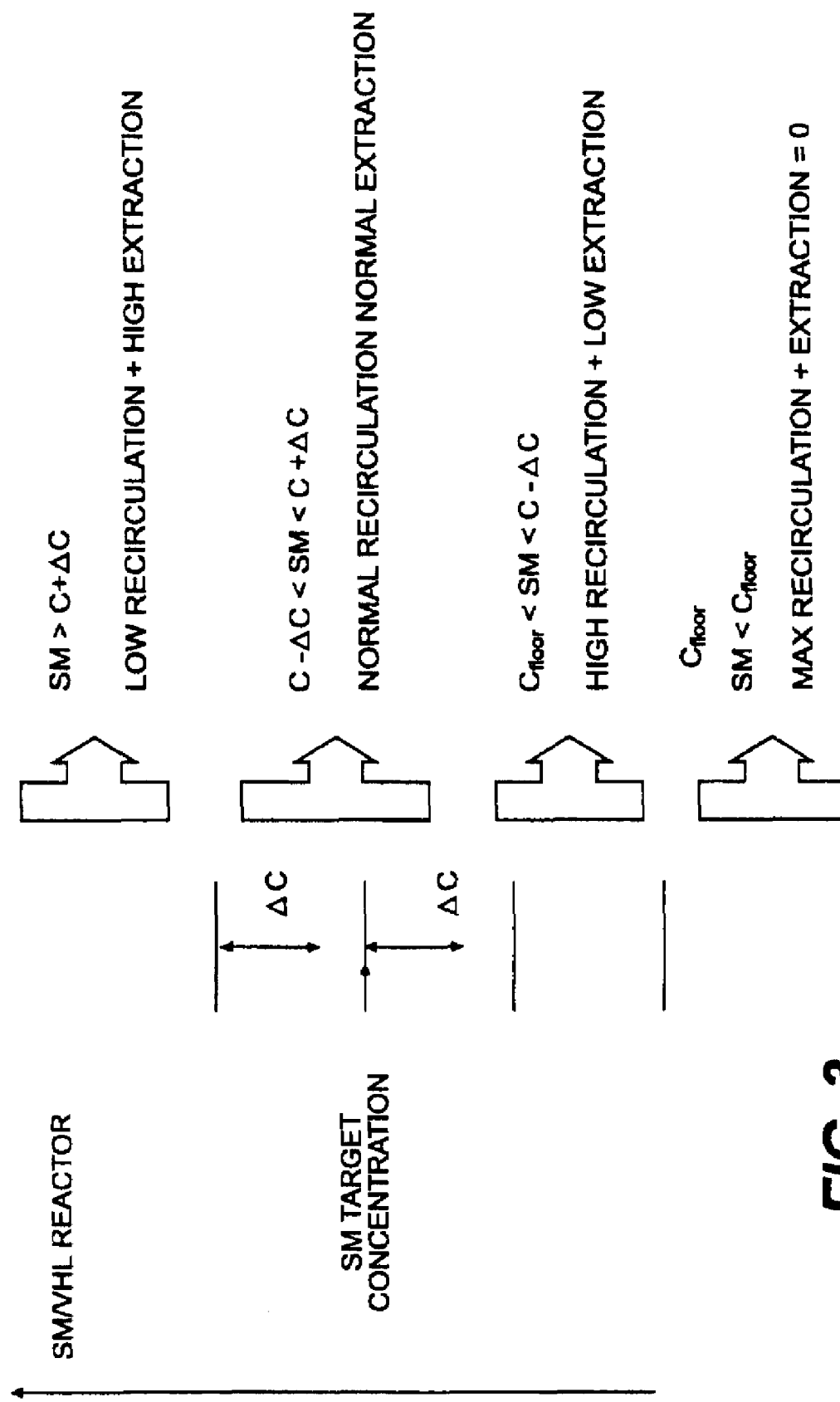
FIG. 3 is a schematic representation of regulation according to the invention.

FIG. 3 shows the implementation of this regulation.

According to another feature of the present invention, a regulation of the air input is also provided in order to maintain a low dissolved oxygen setpoint. This regulation, based on the generation of two different air flow setpoints depending on the dissolved oxygen concentration in the aeration tank 1, and of which the implementation is well known to a person skilled in the art, will serve to constantly maintain a residual dissolved oxygen content of between 0.1 and 1 mg/l. The regulation can also be obtained by stopping the aeration and supplying the mixing energy by mechanical means.

Thus, according to the invention, two distinct parameters are slaved: the recirculation or extraction rate of the mixed liquor to maintain a constant solid matter content in the biological reactor 1, and the control of the air input means 2 to maintain a low residual dissolved oxygen content in the biological reactor.

As it may be understood, the combination of a very high loading activated sludge method with an optimized control system, based on the slaving of the mixed liquor recirculation or extraction means and the air input means, serves not only to obtain a high level of treatment of the carbon pollution in a compact reactor associated with an equally compact clarifier, but above all, to control the method and its performance over time, even during hydraulic overload periods.

Figure 2:
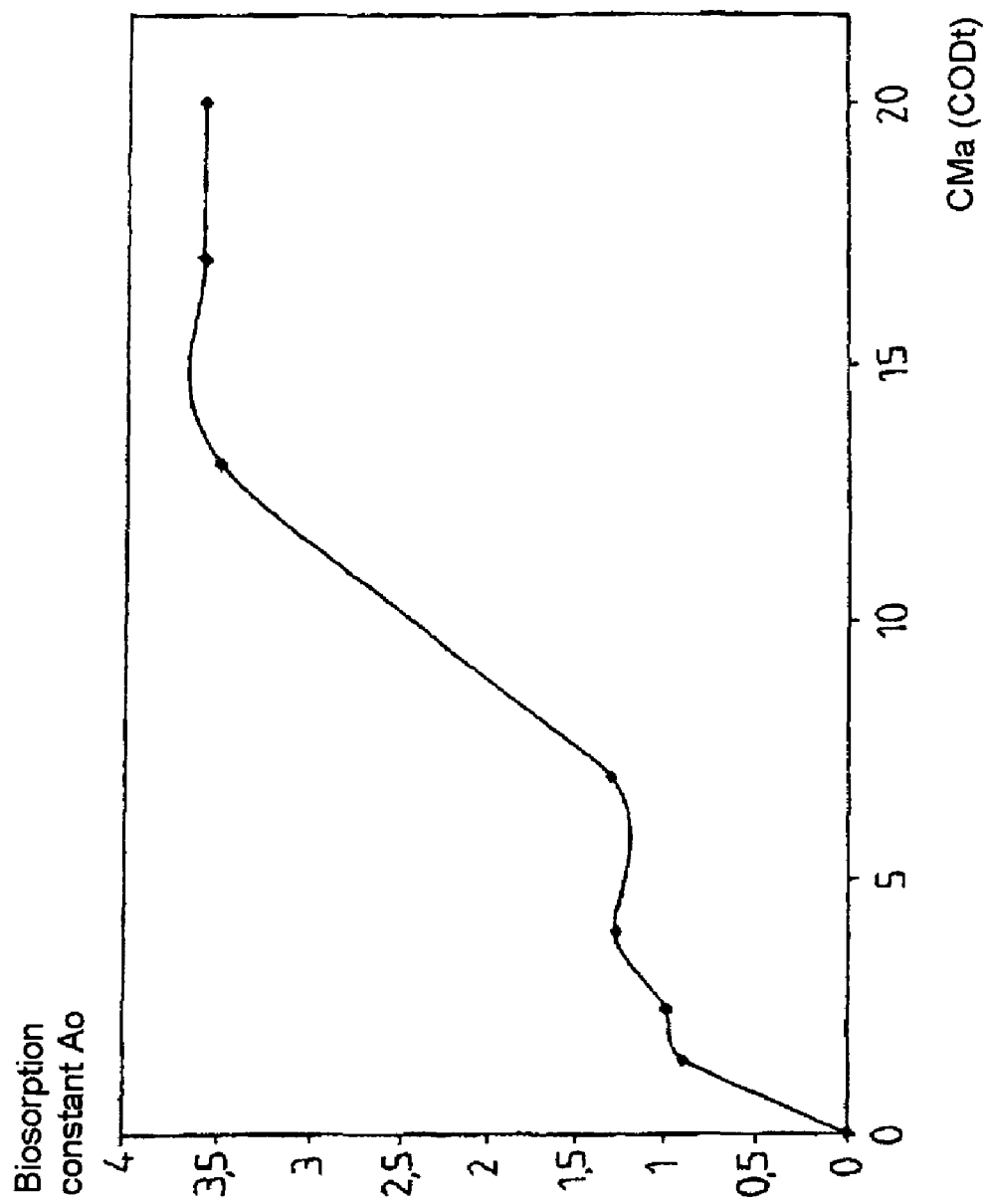
FIG. 2 is a curve showing the variation in the biosorption constant as a function of the applied loading in an embodiment of the method of the invention.

The example of implementation given in the table below shows the leaching resistance, in an installation according to the invention operating under high loading, without slaving on the one hand, and with slaving on the other, and FIG. 2 shows the variation curve of the biosorption constant Ao as a function of the applied mass loading Cma, expressed as total COD. An examination of this curve shows that the higher the applied loading, the higher the biosorption constant.

Examples of VHL (very high loading): leaching resistance

| Without slaving | SM (g/l) | CMa Kg CODt/Kg SM/day | CODt efficiency (%) | SM efficiency (%) |
|---|---|---|---|---|
| Day 1 | 1.5 | 13.6 | 64 | 71 |
| Day 2 | | LEACHING | | |
| Day 3 | 0.4 | 17.3 | 45 | 51 |
| Day 4 | 1.0 | 22.8 | 44 | 50 |
| Day 5 | 1.4 | 14.7 | 58 | 65 |

| With slaving | SM (g/l) | CMa Kg CODt/Kg SM/day | CODt efficiency (%) | SM efficiency (%) |
|---|---|---|---|---|
| Day 1 | 2.0 | 10.8 | 64 | 73 |
| Day 2 | 1.8 | | | |
| Day 3 | 1.7 | 9.8 | 62 | 68 |
| Day 4 | 1.9 | 10.7 | 61 | 67 |
| Day 5 | 2.0 | 9.7 | 58 | 75 |

The invention claimed is:

1. A method for the biological treatment of effluents contaminated with impurities of municipal or industrial origin, comprising the steps:

filling a single aeration tank with high mass loading in which raw or mechanically pretreated effluent is mixed, without prior settling, with a free microbial culture of the activated sludge type, growing in a lightly aerated medium, of the order of 0.1 to 0.2 Kg $O_2$/kg BOD5 removed, the applied organic loading being equal to or greater than 4 Kg COD/Kg SM/day, the hydraulic residence time of the raw effluent in the single aeration tank being between 40 and 60 minutes, a portion of dissolved carbon pollution and nearly the entire colloidal and particulate fraction of the effluent in the tank being biosorbed by activated sludge floc.

2. The method as claimed in claim 1, wherein the value of said mass loading is above 1.5 kg BOD5/Kg SM/day, with a solid matter concentration between 0.5 and 2.5 gSM/l, giving rise to applied volumetric loadings above 3 kg BOD5/$m^3$/day.

3. The method as claimed in claim 1, together with control at the anaerobiosis limit, by regulating the dissolved oxygen content to values between 0.1 and 1 mg/l.

4. The method as claimed in claim 1, wherein high loading sludge has a suspended matter concentration between 0.6 and 1.5 g/l.

5. The method as claimed in claim 1, wherein a regulation system is provided, by adjusting the recirculation rate of the mixed liquor in the single aeration tank, this regulation being carried out so as to maintain the solid matter (suspended matter+biomass) within a preset range, between about 1.0 and 1.5 g/l, and selectively carried out by the continuous measurement of the turbidity of the activated sludge or of the mixed liquor, this measurement being combined with a slaving of the recirculation or extraction rate of said mixed liquor.

6. The method as claimed in claim 1, together with regulation of the air input in the single tank, in order to maintain a low dissolved oxygen setpoint, of the order of 0.1 to 1 mg/l.

7. An installation for the biological treatment of effluents contaminated with impurities of municipal or industrial origin, comprising:

a free culture reactor in which the free culture grows in an aerated medium, in which a portion of the dissolved carbon pollution and nearly the entire colloidal and particulate fraction of the effluent are biosorbed by activated sludge floc, said reactor, which constitutes a single aeration tank, comprising continuous or intermittent air input means, mixing energy being supplied mechanically, means for selective continuous measurement of the turbidity of the activated sludge or of the mixed liquor, means for measuring the dissolved oxygen concentration, for which the resulting data are processed by a servo system for slaving, the mixed liquor recirculation or extraction rate to maintain a constant solid matter content in said reactor while the air input maintains a low residual dissolved oxygen content in said reactor, an intermediate clarifier which separates the sludge from depolluted effluent, and a sludge recirculation circuit from the intermediate clarifier to the free culture reactor, wherein the recirculation or extraction rate is slaved to the turbidity measurement in the reactor.

8. The installation as claimed in claim 7, wherein the reactor operating with high loading activated sludge is an integral mixing aeration tank.

9. The installation as claimed in claim 7, wherein the sensor is positioned directly in the biological reactor.

10. The installation as claimed in claim 7, wherein the sensor is positioned at the outlet of said reactor, on a water line supplying the associated clarifier.

* * * * *